United States Patent
Na (10) Patent No.: US 10,319,530 B2
(45) Date of Patent: Jun. 11, 2019

(54) ELECTRONIC COMPONENT AND MANUFACTURING METHOD THEREOF

(71) Applicant: SAMSUNG ELECTRO-MECHANICS CO., LTD., Suwon-si, Gyeonggi-do (KR)

(72) Inventor: Jae Young Na, Suwon-si (KR)

(73) Assignee: Samsung Electro-Mechanics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/787,377

(22) Filed: Oct. 18, 2017

(65) Prior Publication Data

US 2018/0374648 A1 Dec. 27, 2018

(30) Foreign Application Priority Data

Jun. 27, 2017 (KR) .................. 10-2017-0081008

(51) Int. Cl.
*H01G 4/228* (2006.01)
*H01G 4/30* (2006.01)
*H01G 4/38* (2006.01)
*H01G 4/232* (2006.01)
*H01G 4/248* (2006.01)
*H01G 4/12* (2006.01)

(52) U.S. Cl.
CPC .............. *H01G 4/38* (2013.01); *H01G 4/232* (2013.01); *H01G 4/248* (2013.01); *H01G 4/1227* (2013.01); *H01G 4/1245* (2013.01); *H01G 4/30* (2013.01)

(58) Field of Classification Search
CPC .......... H01G 4/30; H01G 4/228; H01G 4/232
USPC ..................................................... 361/308.1
See application file for complete search history.

(56) References Cited

U.S. PATENT DOCUMENTS

| | | | | |
|---|---|---|---|---|
| 2009/0147440 | A1* | 6/2009 | Cygan | H01G 4/232 361/306.3 |
| 2010/0243307 | A1* | 9/2010 | McConnell | H01G 4/232 174/260 |
| 2013/0284501 | A1* | 10/2013 | McConnell | H05K 1/0271 174/255 |
| 2016/0212843 | A1* | 7/2016 | Park | H05K 1/181 |

FOREIGN PATENT DOCUMENTS

JP 2000-195753 A 7/2000
JP 2011-009435 A 1/2011

* cited by examiner

*Primary Examiner* — Eric W Thomas
(74) *Attorney, Agent, or Firm* — Morgan, Lewis & Bockius LLP (57) ABSTRACT

An electronic component is provided to include: a capacitor array having a structure in which a plurality of capacitors are arranged; a pair of metal frames disposed on side surfaces of the capacitor array, connected to external electrodes of the plurality of capacitors, and including penetration portions formed in positions in which the pair of metal frames are connected to the external electrodes; and a plating member filling the penetration portions. A manufacturing method thereof is further provided.

8 Claims, 6 Drawing Sheets

ELECTRONIC COMPONENT AND MANUFACTURING METHOD THEREOF

CROSS-REFERENCE TO RELATED APPLICATION(S)

This application is based on and claims the benefit of priority to Korean Patent Application No. 10-2017-0081008 filed on Jun. 27, 2017 in the Korean Intellectual Property Office, the disclosure of which is incorporated herein by reference in its entirety.

TECHNICAL FIELD

The present disclosure relates to an electronic component and a manufacturing method thereof.

BACKGROUND

As high capacitance, high voltage, and high reliability are required for capacitors used in electric components of vehicles, and the like, an electrolytic condenser, a film condenser, or the like, has been used.

However, a separate cooling device is required in the electrolytic condenser, the film condenser, or the like, due to their low thermal stability, thereby increasing cost of such electric components.

In order to solve this problem, a method of replacing the electrolytic condenser, the film condenser, or the like, by bonding several tens to several hundreds of multilayer capacitors that are thermally stable, but have low capacitance, to each other to obtain high capacitance may be considered.

As a method of binding the multilayer capacitors according to the related art, there is a method of binding two or three multilayer capacitors to each other using a thermal treatment after applying a binder such as high-temperature solder, or the like, to the multilayer capacitors or a metal frame.

However, this method according to the related art has a problem in that, in order to bind several tens to several hundreds of multilayer capacitors, several processes such as the application of the binder to the multilayer capacitors, stacking of the multilayer capacitors, thermal treatment, and the like, should be undertaken.

SUMMARY

An aspect of the present disclosure may provide an electronic component in which a plurality of capacitors are reliably bonded to each other in a simple manner without any binding means such as high-temperature solder, or the like, and a manufacturing method thereof.

According to an aspect of the present disclosure, an electronic component may include: a capacitor array having a structure in which a plurality of capacitors are arranged; a pair of metal frames disposed on side surfaces of the capacitor array, connected to external electrodes of the plurality of capacitors, and including penetration portions formed in positions in which the pair of metal frames are connected to the external electrodes; and a plating member filling the penetration portions.

Each of the plurality of capacitors may include a ceramic body and first and second external electrodes, wherein the ceramic body includes dielectric layers and a plurality of first and second internal electrodes alternately disposed with each of the dielectric layers interposed therebetween.

The capacitor array may have a structure in which the plurality of capacitors are stacked in a column or in a row.

The capacitor array may have a structure in which the plurality of capacitors are stacked both in a column and in a row.

An area of the penetration portions may be 50% or more of an area of the external electrodes that comes in contact with the pair of metal frames.

The plating member may have a thickness of 10 μm or more.

The metal frames may come in direct contact with the external electrodes.

A plating member may be further formed on portions of an outer surface of the capacitor array on which the pair of metal frames are disposed except for portions of the capacitor array where ceramic bodies of the plurality of capacitors are exposed to outside.

According to another aspect of the present disclosure, a manufacturing method of an electronic component may include: preparing a capacitor array having a structure in which a plurality of capacitors are arranged; disposing a pair of metal frames, connected to external electrodes of the plurality of capacitors and including penetration portions formed in positions in which the pair of metal frames are connected to the external electrodes, on side surfaces of the capacitor array; and plating the capacitor array on which the pair of metal frames are disposed.

Each of the plurality of capacitors may include a ceramic body and first and second external electrodes, wherein the ceramic body includes dielectric layers and a plurality of first and second internal electrodes alternately disposed with each of the dielectric layers interposed therebetween.

The capacitor array may have a structure in which the plurality of capacitors are stacked in a column or in a row.

The capacitor array may have a structure in which the plurality of capacitors are stacked both in a column and in a row.

An area of the penetration portions may be 50% or more of an area of the external electrodes that comes in contact with the pair of metal frames.

A plating member formed in the plating of the capacitor array may have a thickness of 10 μm or more.

In the disposing of a pair of metal frames, the pair of metal frames may be disposed to come in direct contact with the external electrodes.

In the plating of the capacitor array, a plating member may be formed on portions of an outer surface of the capacitor array on which the pair of metal frames are disposed except for portions of the capacitor array where ceramic bodies of the plurality of capacitors are exposed to outside.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
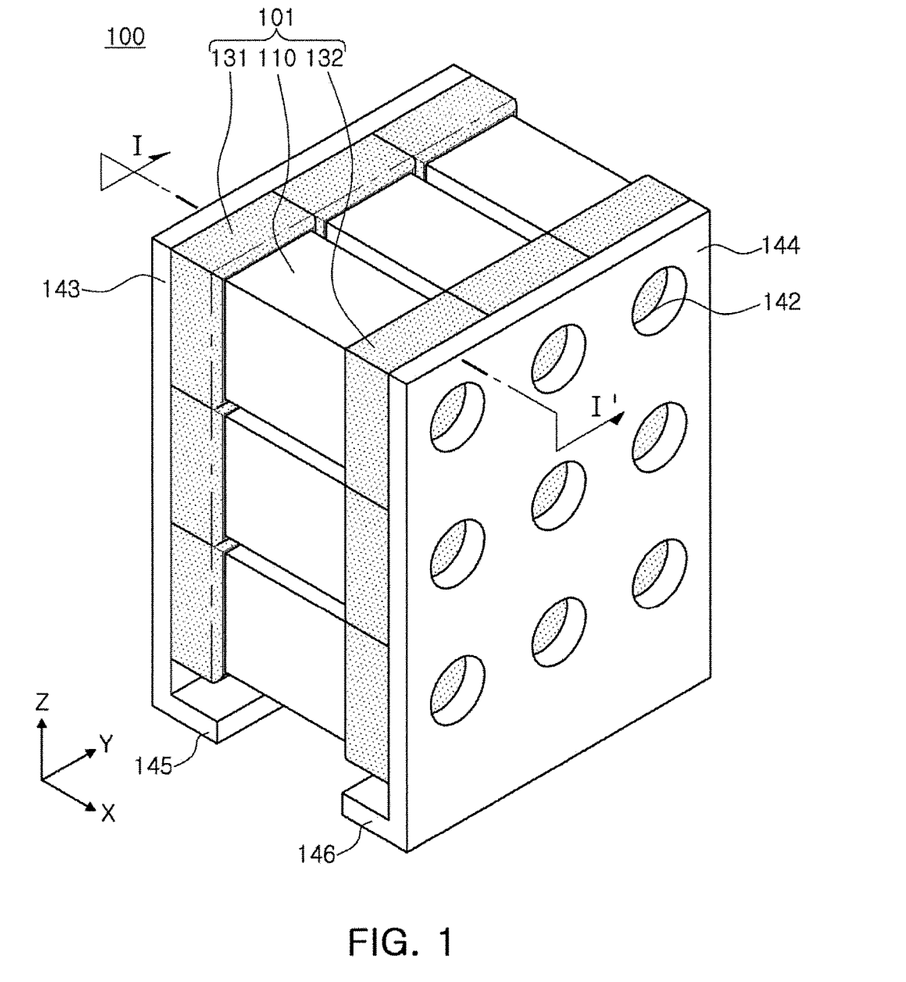
FIG. 1 is a perspective view schematically illustrating a structure of an electronic component according to an exemplary embodiment in the present disclosure.
Figure 2:
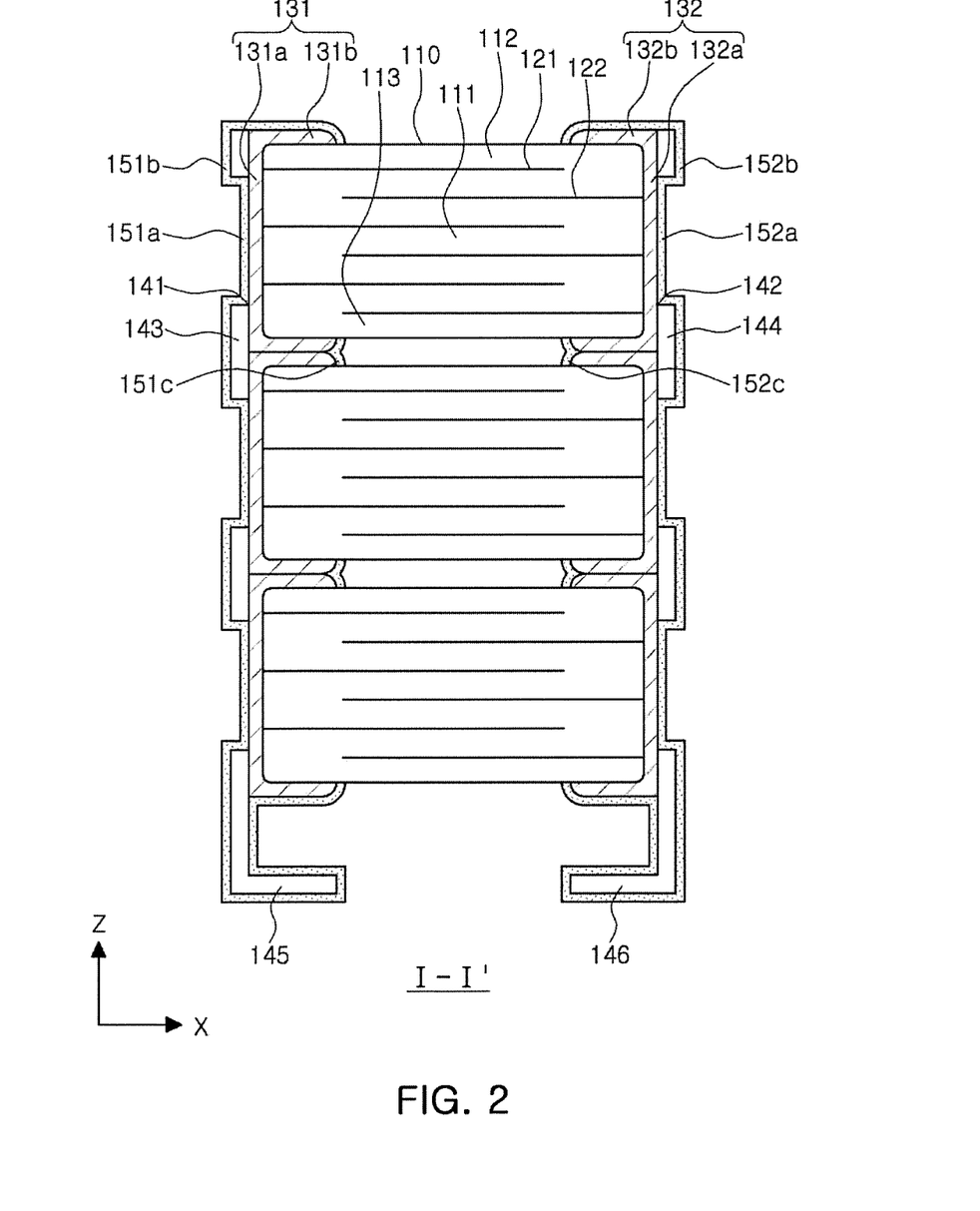
FIG. 2 is a cross-sectional view taken along line I-I' of FIG. 1.

FIG. 1 is a perspective view schematically illustrating a structure of an electronic component according to an exemplary embodiment in the present disclosure, and FIG. 2 is a cross-sectional view taken along line I-I' of FIG. 1. However, in order to clearly describe the structure of the electronic component according to the present exemplary embodiment, a plating member is not illustrated in FIG. 1.

Directions of a ceramic body will be defined in order to clearly describe exemplary embodiments in the present disclosure. X, Y, and Z illustrated in the accompanying drawings refer to a length direction, a width direction, and a thickness direction of the ceramic body, respectively. Here, the thickness direction may be the same as a stacking direction in which dielectric layers are stacked.

Referring to FIGS. 1 and 2, an electronic component 100 according to an exemplary embodiment in the present disclosure may include a capacitor array having a structure in which a plurality of capacitors 101 are arranged; a pair of metal frames 143 and 144 disposed on side surfaces of the capacitor array, connected to external electrodes 131 and 132 of the plurality of capacitors 101, and having penetration portions 141 and 142 formed in positions in which the metal frames 143 and 144 are connected to the external electrodes 131 and 132; and plating members 151a and 152a filling the penetration portions 141 and 142.

The plurality of capacitors 101 may be a multilayer capacitor each including a ceramic body 110 and first and second external electrodes 131 and 132, wherein the ceramic body 110 includes a plurality of dielectric layers 111 and a plurality of first and second internal electrodes 121 and 122 alternately disposed in the Z direction with each of the dielectric layers 111 interposed therebetween and having different polarities from each other. limited, but may be a hexahedral shape, and the ceramic body 110 may have first and second surfaces opposing each other in the Z direction, third and fourth surfaces connected to the first and second surfaces and opposing each other in the X direction, and fifth and sixth surfaces connected to the first and second surfaces and the third and fourth surfaces and opposing each other in the Y direction.

Further, covers 112 and 113 may be formed on uppermost and lowermost portions of the ceramic body 110 in the Z direction. Here, the covers 112 and 113 may be formed of the same material as that of the dielectric layers 111, and formed by stacking at least one dielectric layer that does not include internal electrodes on both surfaces of the ceramic body 110 in the Z direction.

The dielectric layers may contain a ceramic powder, for example, a $BaTiO_3$ based ceramic powder, or the like.

The $BaTiO_3$ based ceramic powder may be formed of, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$ in which Ca, Zr, or the like, is partially solid-dissolved in $BaTiO_3$, or the like, but an example of the $BaTiO_3$-based ceramic powder is not limited thereto.

Here, if necessary, the dielectric layer 111 may further contain at least one of a transition metal oxide or carbide, a rare earth element, magnesium (Mg), aluminum (Al), or the like, in addition to the ceramic powder.

The first and second internal electrodes 121 and 122 may be formed on the dielectric layer 111, stacked in the Z direction, and alternately disposed in the ceramic body 110 to face each other in the Z direction with each of the dielectric layers 111 interposed therebetween.

Here, one ends of the first and second internal electrodes 121 and 122 may be exposed to the third and fourth surfaces of the ceramic body 110, respectively.

The first and second external electrodes 131 and 132 may be formed on to both end portions of the ceramic body 110 opposing each other in the X direction, respectively.

Here, the first and second external electrodes 131 and 132 may include first and second connection portions 131a and 132a and first and second band portions 131b and 132b, respectively.

The first and second connection portions 131a and 132a may be disposed on the third and fourth surfaces of the ceramic body 110, respectively, and come in contact with portions of the first and second internal electrodes 121 and 122 exposed to the outside of the ceramic body 110, respectively, thereby serving to connect the internal electrodes and the external electrodes to each other.

The first and second band portions 131b and 132b may be portions extended from the first and second connection portions 131a and 132a to portions of the first and second surfaces of the ceramic body 110, respectively.

Here, if necessary, the first and second band portions 131b and 132b may be extended from the first and second connection portions 131a and 132a to portions of the fifth and sixth surfaces of the ceramic body 110, respectively.

The first and second band portions 131b and 132b may serve to improve bonding strength of the first and second external electrodes 131 and 132.

Figure 3:
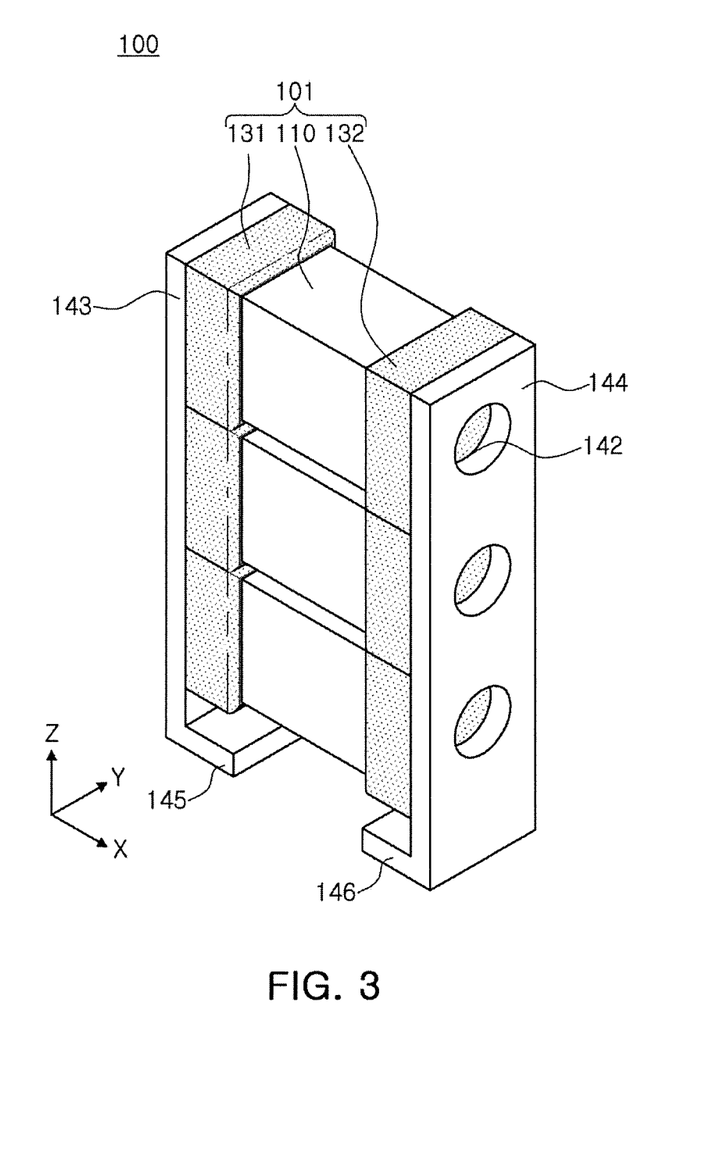
FIG. 3 is a perspective view schematically illustrating a structure of an electronic component according to an exemplary embodiment in the present disclosure.
Figure 4:
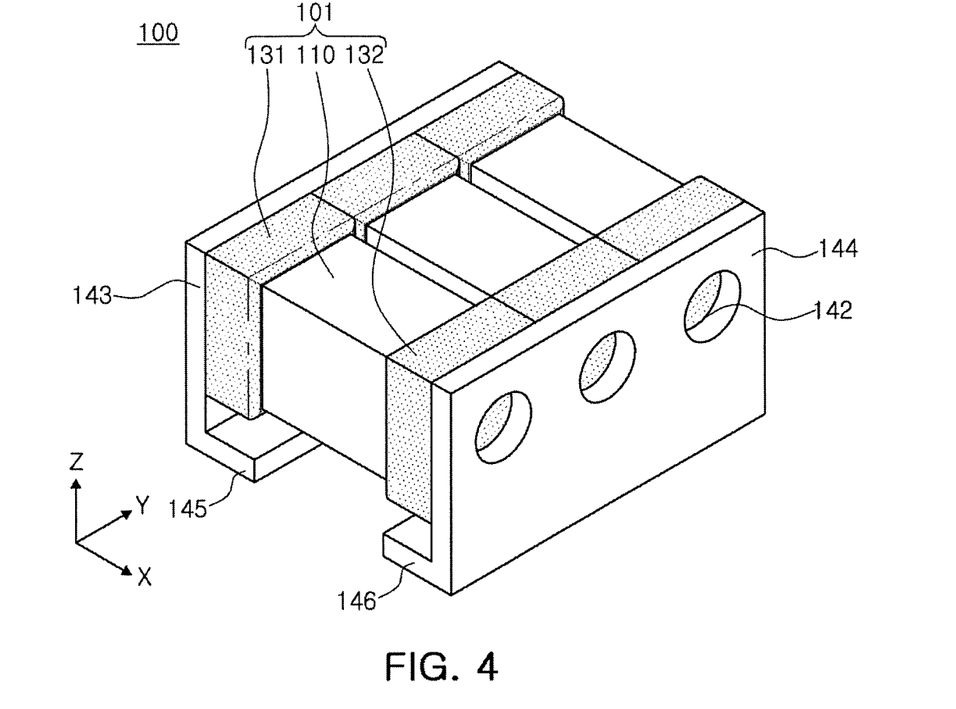
FIG. 4 is a perspective view schematically illustrating a structure of the electronic component according to an exemplary embodiment in the present disclosure.

FIGS. 3 and 4 are perspective views schematically illustrating a structure of the electronic component 100 according to an exemplary embodiment in the present disclosure. However, in order to clearly describe the structure of the electronic component 100 according to the present exemplary embodiment, the plating member is not illustrated in FIGS. 3 and 4.

Referring to FIGS. 3 and 4, the capacitor array may have a structure in which the plurality of capacitors 101 are disposed in a column as illustrated in FIG. 3. Alternatively, the capacitor array may have a structure in which the plurality of capacitors 101 are disposed in a row as illustrated in FIG. 4.

Alternatively, the capacitor array may have a structure in which the plurality of capacitors 101 are stacked in the columns and the rows as illustrated in FIG. 1.

The pair of metal frames may be first and second metal frames 143 and 144, respectively, and may be disposed on the side surfaces of the capacitor array and electrically connected to the first and second external electrodes 131 and 132, respectively, to thereby serve as common electrodes. Further, the first and second penetration portions 141 and 142 may be formed at the positions at which the pair of the metal frames 143 and 144 are connected to the first and second external electrodes 131 and 132. The first and second metal frames 143 and 144 may come into direct contact with the first and second external electrodes 131 and 132, respectively.

In this case, areas of the first and second penetration portions 141 and 142 may be 50% or more of areas of the external electrodes 131 and 132 that come in contact with each other so that the metal frames 143 and 144 and the capacitor array may be sufficiently adhered to each other. That is, the areas of the first and second penetration portions 141 and 142 may be 50% or more of areas of the first and second connection portions 131a and 132a on the third and fourth surfaces.

In this case, a material of the first and second metal frames 143 and 144 may be a material that is not deformed and/or properties thereof are not changed at a soldering temperature, and it may be preferable to select a material having sufficient wetting properties.

Here, the first and second metal frames 143 and 144 may include first and second horizontal portions 145 and 146 and have an L shape so that the first and second metal frames 143 and 144 may be easily mounted on a board.

The plating members 151a and 152a filling the first and second penetration portions 141 and 142 may allow the metal frames 143 and 144 and the plurality of capacitors 101 to be bonded to each other, and the plurality of capacitors 101 may be reliably bonded to the metal frames 143 and 144 in a simple manner without any separate binding means such as high-temperature solder, or the like. The plating members 151a and 152a may come into direct contact with the first and second external electrodes 131 and 132.

In this case, the plating members 151a and 152a may have a thickness of 10 μm or more so that the first and second metal frames 143 and 144 and the capacitor array may be sufficiently adhered to each other.

Here, the plating members may be further formed on portions 151b, 152b, 151c, and 152c of outer surfaces of the capacitor array on which the first and second metal frames 143 and 144 are disposed, except for portions on which the ceramic bodies 110 of the capacitors 101 are disposed. Since plating is performed on the capacitor array on which the metal frames 143 and 143 are disposed, the plating member may be formed on exposed portions 151b and 152b of the metal frames exposed to the outside and portions 151c and 152c thereof exposed to the outside of the external electrodes. The plating member may be formed of Ni/Sn, and serve to improve binding strength between the metal frames and the capacitors or serve as an adhesive with a solder at the time of mounting the electronic component 100 on a board.

According to the present exemplary embodiment, since the plurality of capacitors may be reliably bonded to each other in a simple manner without any binding means such as high-temperature solder, or the like, defamation or damage of the capacitors due to thermal or mechanical causes may be prevented, and high capacitance may be achieved without having a separate cooling device.

Particularly, even if the number of capacitors to be bonded is increased, the capacitors may be bonded to each other at once by a plating method. Therefore, the larger the number of capacitors to be bonded, the higher the efficiency as compared to a binding method using the binding means such as the high-temperature solder, or the like.

Hereinafter, a manufacturing method of an electronic component according to an exemplary embodiment of the present disclosure will be described.

A capacitor array in which a plurality of capacitors 101 are arranged may be prepared.

Here, the capacitors 101 may be prepared by forming first and second external electrodes on both surfaces of a ceramic body 110 opposing each other, respectively.

In this case, the ceramic body 110 may have a structure in which a plurality of dielectric layers 111 and a plurality of first and second internal electrodes 121 and 122 are included by preparing a plurality of ceramic sheets, printing a conductive paste on the ceramic sheets to form first and second internal electrodes 121 and 122, and stacking and compressing the plurality of ceramic sheets.

Figure 5:
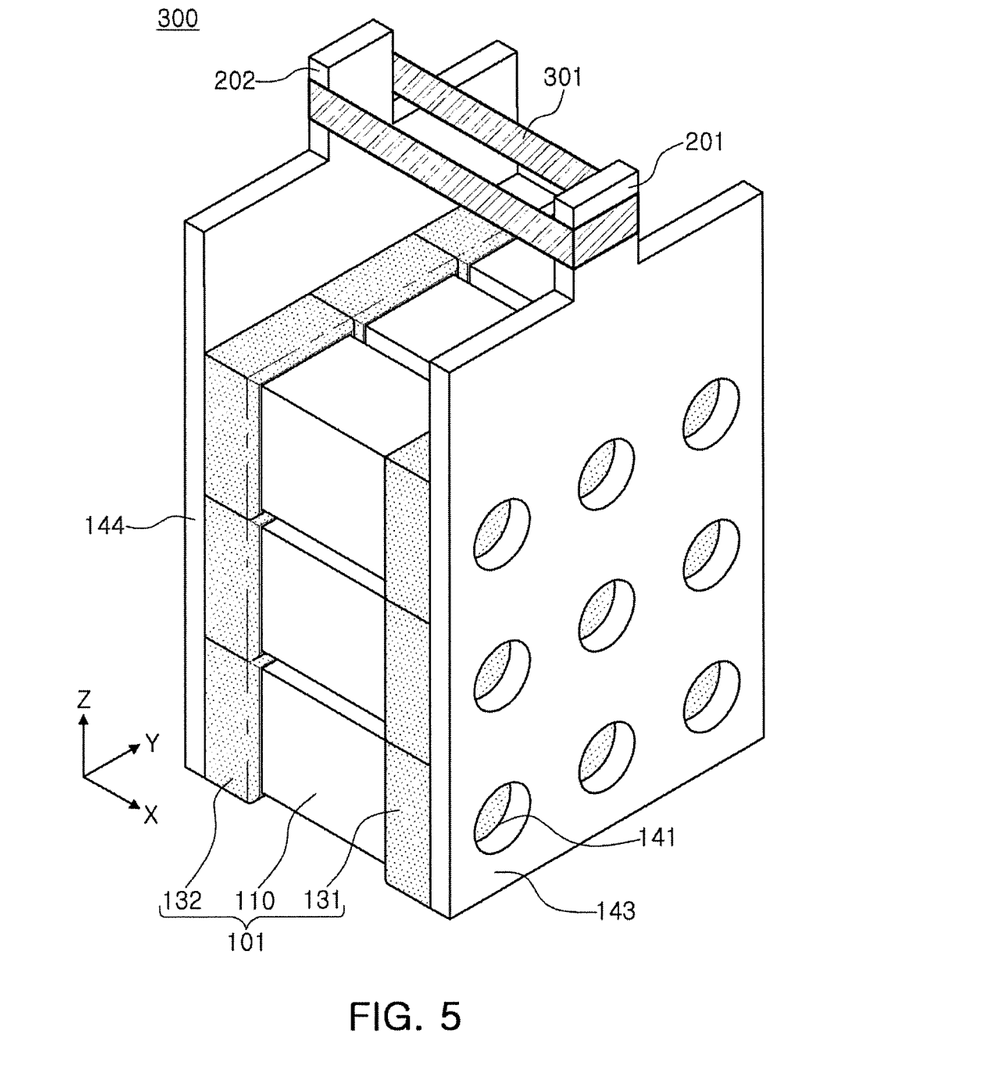
FIG. 5 is a perspective view illustrating a capacitor array in which a pair of metal frames are disposed in a process of manufacturing the electronic component according to an exemplary embodiment in the present disclosure.

Next, as illustrated in FIG. 5 showing an exemplary embodiment of the present disclosure, first and second metal frames 143 and 144, that are connected to first and second external electrodes 131 and 132 of a plurality of capacitors 101 of a capacitor array 300 and that include first and second penetration portions 141 and 142 formed in positions in which the first and second metal frames 143 and 144 are connected to the first and second external electrodes 131 and 132, may be disposed on side surfaces of the capacitor array 300.

Here, first and second support portions 201 and 202 may be formed in the first and second metal frames 143 and 144 so that the first and second metal frames 143 and 144 and the capacitor array 300 may be compressed and attached to each other, and the first and second support portions 201 and 202 may be connected to each other using a connection member 301.

Figure 6:
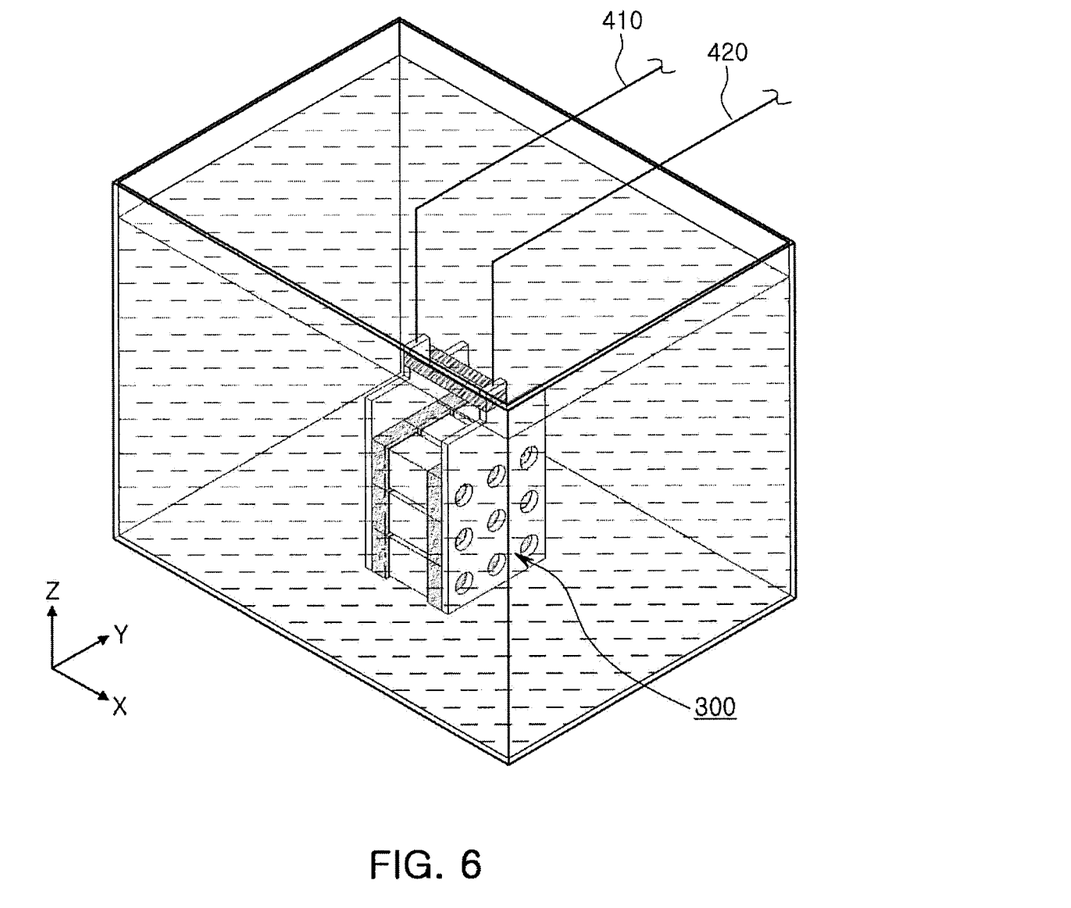
FIG. 6 is a perspective view illustrating plating of the capacitor array in which the pair of metal frames are disposed in the process of manufacturing the electronic component according to an exemplary embodiment in the present disclosure.

Then, as illustrated in FIG. 6 showing an exemplary embodiment of the present disclosure, a capacitor array 300 including the first and second metal frames 143 and 144 may be dipped in a plating bath and plating may be performed thereon to be connected to electrodes 410 and 420, such that the plurality of capacitors may be reliably bonded to each other in a simple manner without any binding means such as high-temperature solder, or the like.

Here, in performing the plating, a plating member may have a thickness of 10 μm or more in order to allow the first and second metal frames 143 and 144 and the capacitor array 300 to be sufficiently adhered to each other.

Further, after the plating is completed, the first and second support portions 201 and 202 may be removed, and first and second horizontal portions 145 and 146 may be formed in the first and second metal frames 143 and 144 so that the electronic component may be easily mounted on a board.

As set forth above, according to exemplary embodiments of the present disclosure, since the plurality of capacitors may be reliably bonded to each other in a simple manner without any binding means such as high-temperature solder, or the like, deformation or damage due to thermal or mechanical causes may be prevented, and high capacitance may be achieved without a separate cooling device.

While exemplary embodiments have been shown and described above, it will be apparent to those skilled in the art that modifications and variations could be made without departing from the scope of the present invention as defined by the appended claims.

What is claimed is:

1. An electronic component comprising:
    a capacitor array having a structure in which a plurality of capacitors are arranged;
    a pair of metal frames disposed on side surfaces of the capacitor array, connected to external electrodes of the plurality of capacitors, and including penetration portions formed in positions in which the pair of metal frames are connected to the external electrodes; and
    a plating member filling the penetration portions, wherein the plating member is disposed on exposed portions of the pair of metal frames that are exposed to outside.

2. The electronic component of claim 1, wherein each of the plurality of capacitors includes a ceramic body and first and second external electrodes, the ceramic body including dielectric layers and a plurality of first and second internal electrodes alternately disposed with each of the dielectric layers interposed therebetween.

3. The electronic component of claim 1, wherein, the capacitor array has a structure in which the plurality of capacitors are stacked in a column or in a row.

4. The electronic component of claim 1, wherein the capacitor array has a structure in which the plurality of capacitors are stacked both in a column and in a row.

5. The electronic component of claim 1, wherein an area of the penetration portions is 50% or more of an area of the external electrodes that comes in contact with the pair of metal frames.

6. The electronic component of claim 1, wherein the plating member has a thickness of 10 μm or more.

7. The electronic component of claim 1, wherein the pair of metal frames comes in direct contact with the external electrodes.

8. The electronic component of claim 1, wherein the plating member is further formed on portions of an outer surface of the capacitor array on which the pair of metal frames are disposed, except for portions of the capacitor array where ceramic bodies of the plurality of capacitors are exposed to outside.

* * * * *